United States Patent [19]

Knox

[11] Patent Number: 5,093,294
[45] Date of Patent: Mar. 3, 1992

[54] ZEOLITE CATALYSTS SUITABLE FOR HYDROCARBON CONVERSION

[75] Inventor: Thomas Knox, Surrey, England

[73] Assignee: The British Petroleum Company p.l.c., London, England

[21] Appl. No.: 545,309

[22] Filed: Jun. 26, 1990

Related U.S. Application Data

[62] Division of Ser. No. 302,482, Jan. 26, 1989, Pat. No. 4,990,715.

[30] Foreign Application Priority Data

Feb. 11, 1988 [GB] United Kingdom ................. 8803112

[51] Int. Cl.$^5$ .............................................. B01J 29/28
[52] U.S. Cl. ................................................................ 502/61
[58] Field of Search ............................... 502/61, 71, 77

[56] References Cited

U.S. PATENT DOCUMENTS

| 4,608,355 | 8/1986 | Chu ....................................... 502/71 |
| 4,946,813 | 8/1990 | Shum ..................................... 502/61 |

FOREIGN PATENT DOCUMENTS 215579  3/1987  European Pat. Off. .............. 502/61

*Primary Examiner*—Carl F. Dees
*Attorney, Agent, or Firm*—Larry W. Evans; Joseph G. Curatolo; Sue E. Phillips

[57] ABSTRACT

A novel catalyst composition comprising a crystalline aluminosilicate having a molar ratio of silica to alumina of at least 5:1, the aluminosilicate carrying gallium and silver, is useful in the conversion at elevated temperature of a $C_2$–$C_{12}$ hydrocarbon feedstock into aromatic hydrocarbons.

6 Claims, No Drawings

ZEOLITE CATALYSTS SUITABLE FOR HYDROCARBON CONVERSION

This is a divisional of co-pending application Ser. No. 07/302,482 filed Jan. 26, 1989 now U.S. Pat. No. 4,990,715.

The present invention relates to zeolite catalysts suitable for hydrocarbon conversion.

UK Patent Specification No. 1561590 discloses a process for the production of aromatic hydrocarbons, comprising contacting at elevated temperature a $C_3$–$C_{12}$ hydrocarbon feedstock with a defined zeolite catalyst containing gallium. EP-A-50021 discloses a similar process using a $C_2$ hydrocarbon feedstock.

Surprisingly, it has now been found that the yield of aromatics in a process of this type can be improved by incorporating silver into the catalyst.

Accordingly, the present invention provides a catalyst composition comprising a crystalline aluminosilicate having a molar ratio of silica to alumina of at least 5:1, said aluminosilicate carrying gallium and silver.

The invention further provides a process for producing aromatic hydrocarbons, which comprises bringing a catalyst composition according to the invention into contact with a $C_2$–$C_{12}$ hydrocarbon feedstock at elevated temperature.

By $C_2$–$C_{12}$ feedstock is meant throughout this specification a feedstock containing a single hydrocarbon component or mixtures of saturated and/or unsaturated $C_2$–$C_{12}$ hydrocarbons. The feedstock is preferably a $C_3$–$C_4$ hydrocarbon feedstock. $C_3$ and $C_4$ feeds containing propane, propene, isobutane and/or isobutene in the feedstock are particularly useful. Other useful feedstocks include naphtha, in which case the process is a reforming process.

The optimum temperature for the process according to the invention depends on the feedstock used. Preferably, the temperature is in the range of from 300° to 700° C. When using a $C_3$–$C_4$ hydrocarbon feedstock, the temperature is preferably in the range of from 500° to 600° C. Preferably, the feedstock is passed over the catalyst composition in the vapour phase, if desired in admixture with an inert gas for example nitrogen. Reaction pressures are suitably from 1 to 20 bar absolute, preferably 2 to 10 bar absolute.

A wide range of crystalline aluminosilicates are useful as the basis of the catalyst composition according to the invention. The silica to alumina ratio is preferably in the range of from 10:1 to 200:1, especially 10:1 to 70:1. Typical zeolites include the ZSM zeolites, for example ZSM-5, ZSM-8, ZSM-11, ZSM-12 and ZSM-35, which are described in U.S. Pat. No. 3,970,544. A further suitable aluminosilicate is that designated zeolite Theta-1 and described in EP-A-57049. The use of zeolites ZSM-11 and, especially, ZSM-5, is preferred.

In the catalyst composition according to the invention, the gallium may have been introduced by ion exchange. In this case, gallium ions may be provided as an aqueous solution of a gallium salt, for example gallium nitrate, gallium chloride or gallium sulphate. Such catalysts may be produced by conventional ion exchange techniques and the catalysts so produced are subsequently dried. For example an aqueous solution of a gallium compound such as gallium nitrate may be placed in contact with the aluminosilicate at ambient or elevated temperature, e.g. by refluxing. The exchanged aluminosilicate may then be separated for example by decantation followed by filtration, washed several times with deionised water and finally dried. Before addition to the aqueous solution of the gallium compound, the aluminosilicate may be acid treated.

Alternatively, the gallium may be deposited on the aluminosilicate; it may be impregnated on the surface of the aluminosilicate or incorporated in the intracrystalline zeolite cavities as a gallium compound which gives rise to gallium oxide during activation of the catalyst prior to contact with the hydrocarbon feedstock. An example of a suitable gallium compound is gallium nitrate. Conventional impregnation techniques may be used to produce these catalysts. The impregnation for example may be achieved by preparing excess of a solution, for example an aqueous solution, of a gallium compound, for example gallium nitrate, and adding the aluminosilicate to this aqueous solution with thorough stirring to form a paste. The paste may subsequently be dried for example using an elevated temperature in vacuum. The so-called incipient wetness technique is also a useful impregnation technique. Here, a solution of a gallium salt is added to an amount of the aluminosilicate sufficient to absorb the entire volume of liquid.

Where the catalyst composition is prepared by using a compound of gallium which ionises in aqueous solution for example gallium nitrate it is inevitable that some of the gallium ions will be exchanged with the cations in the aluminosilicate even if the preparation was directed to impregnation of the aluminosilicate.

Whichever method of catalyst preparation is used, the amount of gallium present in the catalyst compositions may for instance be in the range of from 0.05 to 10%, preferably 0.1 to 7% by weight of the total aluminosilicate in the catalyst composition.

Similarly, the silver in the catalyst composition may have been introduced by ion exchange or by deposition using an aqueous or non-aqueous solution of a silver salt, in ways directly analogous to those described above for the gallium. Silver nitrate is a convenient water-soluble salt for use in the catalyst preparation. Preferably the amount of silver present in the catalyst composition is in the range of from 0.01 to 10, preferably 0.1 to 7% by weight of the total aluminosilicate in the catalyst composition.

The catalyst composition may if desired contain other metal components in addition to gallium and silver. Preferably however the composition contains gallium and silver as the only metal components.

The invention also provides a process for the preparation of a catalyst composition according to the invention, which comprises treating a crystalline aluminosilicate having a molar ratio of silica to alumina of at least 5:1, with a solution or solutions containing gallium and silver. The order of introduction of gallium and silver is immaterial. Gallium may be introduced followed by silver, silver may be introduced followed by gallium, or both may be introduced together using mixed salt solutions.

The catalyst composition according to the invention may also if desired contain a binder. Any suitable binder commonly used for zeolite catalysts may be used, for example silica, alumina, or a clay. The binder, if present, may be incorporated into the catalyst at any suitable stage in the catalyst preparation, either before or after the introduction of gallium and/or silver.

The catalyst composition is suitably activated prior to contact with the hydrocarbon feedstock. The activation may be carried out by heating the catalyst at a temperature of between 400° and 650° C., preferably between 500° and 600° C. Activation may for example be carried out in an atmosphere of nitrogen, air, or hydrogen. The activation may if desired be carried out in the reactor tube itself prior to the reaction.

The following Examples illustrate the invention.

EXAMPLE 1

250 g ZSM-5 zeolite, silica to alumina ratio 36:1, prepared by the method described in EP-A-30811, was washed with 180 ml of 70% nitric acid in 1070 ml of distilled water by stirring for 30 minutes. The zeolite was filtered and washed with 4×500 ml portions of distilled water, dried under vacuum at 100° C. overnight, and then sieved to less than 500 microns. The sieved zeolite was calcined in a steel tray at 550° C. for 60 hours under a flow of air of 2.5 l/min.

The calcined zeolite was refluxed for 4 hours in a solution of 250 ml gallium nitrate (0.025 g of Ga per ml) and 1750 ml of distilled water, the solution being buffered to pH 2.3 with ammonia solution. The zeolite was filtered hot and washed with 4×500 ml portions of distilled water then dried in a vacuum oven at 100° C. overnight.

The dried zeolite was sieved to less than 500 microns and mixed with a silica binder (LUDOX AS40, Trade Mark) to give a dry zeolite to binder ratio of 60:40. The bound zeolite was sieved to give a particle size of 8–30 mesh, and this material was treated with 16% v/v steam in air at 550° C. for 2 hours at a gas hourly space velocity of 200 $h^{-1}$.

EXAMPLE 2 (COMPARATIVE)

A 20 ml (14 g) portion of the product of Example 1 was placed in a stainless steel tubular reactor and temperatures were raised to 535° C. under flowing hydrogen at atmospheric pressure. When the reactor had come to temperature the hydrogen flow was stopped and the reactor purged with nitrogen. The pressure was raised to 2 bar absolute and propane was passed through the reactor at a rate of 0.8 weight hourly space velocity, the furnace controls being adjusted to maintain an average bed temperature of 535° C. The reaction products were separated into gas and liquid phases in a condensor system and analysed by gas chromatography.

Conversion of propane at 47 hours on stream was found to be 65.15 wt %, with a selectivity to aromatics of 50.45 wt %.

EXAMPLE 3

A 20 ml (14 g) sample of the product of Example 1 was mixed with 15 ml of distilled water to which 0.22 g of silver nitrate had been added. The catalyst was dried in a vacuum at 100° C. overnight, and then tested according to the method in Example 2. The conversion of propane at 47 hours on stream was found to be 77.45 wt % with selectivity to aromatics of 58.5 wt %.

EXAMPLE 4

250 g of zeolite ZSM-5 was washed with 180 ml of 70% nitric acid in 1070 ml of distilled water by stirring for 30 minutes. The zeolite was then filtered and washed with 4×500 ml portions of distilled water, dried under vacuum at 100° C. overnight, and sieved to less than 500 microns. The dried zeolite was calcined in a steel tray at 550° C. for 60 hours under a flow of air of 2.5 l/minute.

The calcined zeolite was refluxed in 2 l of 2 m ammonium nitrate buffered to pH9 with ammonia for 2 hours, filtered and washed. This was repeated and the catalyst dried overnight under vacuum at 100° C. The zeolite was sieved to less than 500 microns and impregnated with 130 ml of a pH adjusted (pH 2.3) gallium nitrate solution (0.025 g Ga/mol) such that the bound catalyst would be 0.8 wt % Ga. The Ga impregnated zeolite was bound with silica (LUDOX AS 40, Trade Mark) to give a zeolite:binder ratio of 60:40 when dried. The bound zeolite was sieved to give a particle size of 8–30 mesh, and this material was treated with 16% v/v steam in air at 550° C. for 2 hours at a gas hourly space velocity of 200 $h^{-1}$.

EXAMPLE 5 (COMPARATIVE)

20 ml (13.5 g) of the product of Example 4 was treated and tested according to the method in Example 2. The propane conversion at 49 hours on stream was found to be 60.02 wt % with a selectivity to aromatics of 52.24 wt %.

EXAMPLE 6

20 ml (13.5 g) of the product of Example 4 was mixed with 15 ml of distilled water containing 0.21 g of silver nitrate. The catalyst was dried overnight under vacuum at 100° C. The catalyst was treated and tested according to the method in Example 2. The conversion of propane at 51 hours on stream was found to be 73.16 wt % with a selectivity to aromatics of 54.50 wt %.

EXAMPLE 7

20 ml (13.5 g) of the product of Example 4 was mixed with 15 ml of distilled water containing 0.1 g of silver nitrate. The catalyst was dried overnight under vacuum at 100° C. The catalyst was treated and tested according to the method in Example 2. The conversion of propane at 51 hours on stream was found to be 72.45 wt % with a selectivity to aromatics of 55.04 wt %.

EXAMPLE 8

A catalyst was prepared as described in Examples 4 and 7, and tested in a quartz tubular reactor vertically mounted in a furnace. The catalyst charge was 10 mls. This was treated with hydrogen flowing at 90 ml/min for 2 hours at 520° C. The temperature was then raised to 529° C. and the feed (commercial naptha) was passed over the catalyst at 12 ml/hr. The hydrogen flow was adjusted so as to give a $H_2$/hydrocarbon feed ratio of approximately 2.0. A product sample was taken at 3.5 hours onstream. This was weighed and analysed using gas chromotography. The total liquid yield after 3.5 hours was 68.5 wt % with a selectivity to aromatics of 97.60 wt %.

EXAMPLE 9 (COMPARATIVE)

The process of Example 8 was repeated using the catalyst of Example 4. The total liquid yield after 3.5 hours was 65.0 wt %, with a selectivity to aromatics of 87.96 wt %.

I claim:

1. A catalyst composition comprising a crystalline aluminosilicate having a molar ratio of silica to alumina of at least 5:1, said aluminosilicate carrying gallium and silver.

2. A catalyst composition as claimed in claim 1, in which the crystalline aluminosilicate is ZSM-5, ZSM-8, ZSM-11, ZSM-12, ZSM-35 or Theta-1.

3. A catalyst composition as claimed in either claim 1 or claim 2, in which the amount of gallium is in the range of from 0.05 to 10% by weight of the total aluminosilicate.

4. A catalyst composition as claimed in any one of claims 1 to 3, in which the amount of silver is in the range of from 0.01 to 10% by weight of the total aluminosilicate.

5. A process for the preparation of a catalyst composition as claimed in any one of claims 1 to 4, which comprises treating a crystalline aluminosilicate having a molar ratio of silica to alumina of at least 5:1, with a solution or solutions containing gallium and silver.

6. A catalyst composition comprising a crystalline aluminosilicate having a molar ratio of silica to alumina of at least 5:1, said aluminosilicate carrying gallium and silver and said composition containing gallium and silver as the only metal components.

* * * * *